United States Patent [19]

Bayes

[11] 3,956,847
[45] May 18, 1976

[54] LIFELIKE WEIGHT AND LURE

[76] Inventor: James W. Bayes, 11701 S. Emerson Road, Canby, Oreg. 97013

[22] Filed: Oct. 29, 1974

[21] Appl. No.: 518,760

[52] U.S. Cl. ................................ 43/43.1; 43/42.45; 43/42.49
[51] Int. Cl.² ......................................... A01K 95/00
[58] Field of Search............. 43/42.39, 42.45, 42.48, 43/42.49, 43.12, 43.1, 2, 43.13

[56] References Cited
UNITED STATES PATENTS

| | | | |
|---|---|---|---|
| 252,628 | 1/1882 | Smith | 43/42.45 |
| 2,109,693 | 3/1938 | Gaines et al. | 43/44.97 |
| 2,239,802 | 4/1941 | Westby | 43/42.39 |
| 2,373,417 | 4/1945 | Rosegard | 43/42.48 |
| 2,577,965 | 12/1951 | Hinkson | 43/43.13 |
| 2,645,053 | 7/1953 | Moritz | 43/43.13 |
| 3,688,434 | 9/1972 | LeVau | 43/44.97 |

*Primary Examiner*—Warner H. Camp

[57] ABSTRACT

A fishing lure for use by a commercial fisherman, and which serves to lure fish out of a school and cause them to strike the commercial setup; the device consisting of a weight that is in the shape of a fish, the device being attached to the commercial setup so to take the deep lines downwardly.

1 Claim, 3 Drawing Figures

LIFELIKE WEIGHT AND LURE

This invention relates generally to fishing lures for commercial setups.

It is generally well known among commercial fishermen that spherical ball leads are utilized as weights in order to get their deep lines downwardly. Such ball leads accomplish this task only but they do not serve any additional purposes.

Accordingly it is a principal object of the present invention to provide a deep line weight which is in the shape of a fish so that as it descends downwardly through a scholl of fish, the weight simulating another school fish causes some of the school of fish to turn and follow it and grab other lures that are adjacent thereto on the commercial setup.

Another purpose of the present invention is to provide a lifelike weight and lure which accordingly besides serving to lower downwardly the deep lines and attracting fish it improves the amount of the fish catch.

Other objects are to provide a weight and lure which is simple in design, inexpensive to manufacture, rugged in construction, easy to use and efficient in operation.

These and other objects will be readily evident upon a study of the following specification and the accompanying drawing, wherein.

Figure 1:
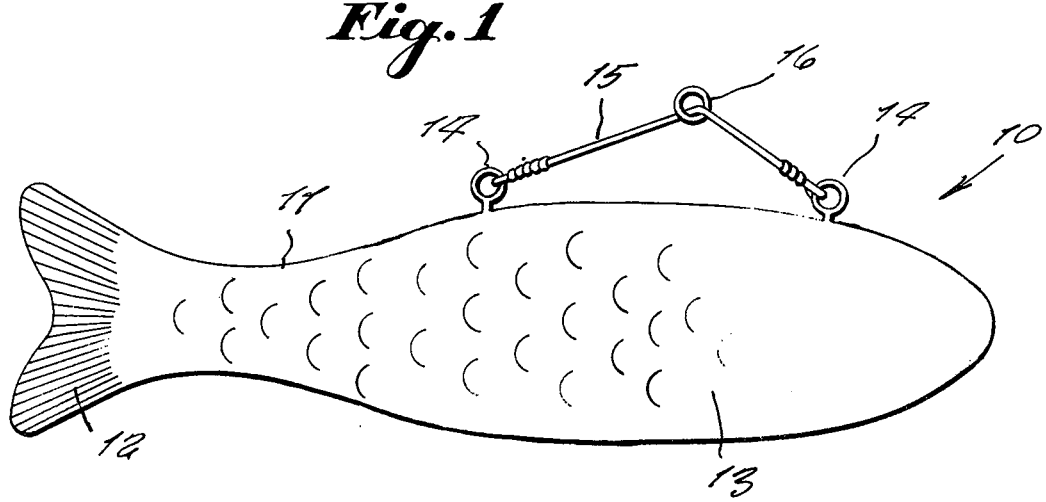
FIG. 1 is a side elevation view of the present invention.
Figure 2:
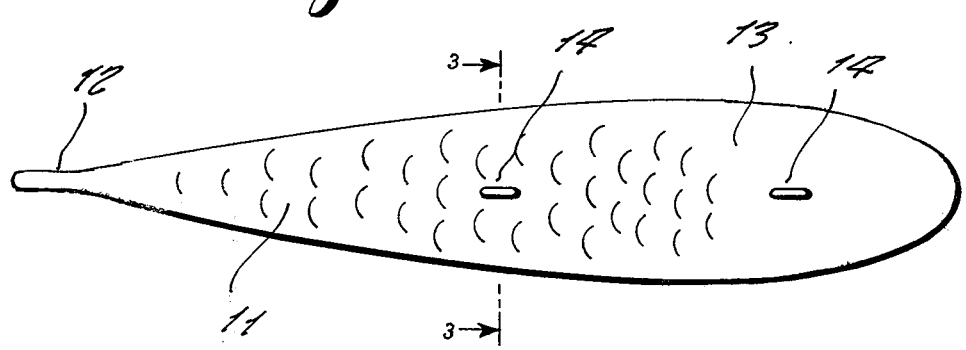
FIG. 2 is a top plan view thereof.
Figure 3:
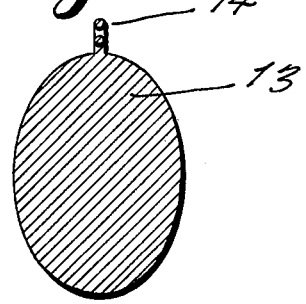
FIG. 3 is a cross sectional view taken on line 3—3 of FIG. 2.

Referring now to the drawing in detail, the reference numeral 10 represents a lifelike weight and lure according to the present invention wherein the same is comprised of a quantity of lead metal ranging anywhere from ten to fifty pounds and which is cast into the shape of a fish 11. The fish 11 does not include any eyes, mouth, gills or fins, however it does include a tail 12 at its one end. It may be made in a size that is approximately 18 inches in length, 4 inches wide and the tail thereof may be approximately 5 inches across from top to bottom.

Along a top of the body 13 of the simulated fish 11 there are a pair of spaced apart brass rings 14 permanently affixed to the body 13; a forward one of the brass rings 14 forming the head lead ring is located over the head portion of the fish body, and the other of the brass rings is located directly at the balance point of the body.

A line 15 of relatively short length is formed from one quarter inch cable and is connected at its opposite ends to the brass rings 14 to provide a harness, the line 15 being threaded through a ring 16 for connection to the deep line commercial setup of the fisherman.

In operative use, it is now evident that when the weight 10 is attached to the deep lines, so to pull the deep lines downward, the weight will go right through a school of fish, simulating another fish. The school of fish in turn follow it and grab other lures of the commercial setup that are adjacent thereto. Thus the device serves to lower the deep lines and at the same time improve the amount of catch.

While various changes may be made in the detail construction, it is understood that such changes will be within the spirit and scope of the present invention as defined by the appended claims.

What I claim is:

1. In a lifelike weight and lure, the combination of a weight that is cast into the shape of a fish and which includes a portion simulating a fish body and an end portion simulating a fish tail integral therewith, means whereby said weight is secured to deep lines of a commercial fisherman setup, said means comprising a pair of brass rings in spaced apart relation along a top of said weight body, said brass rings having opposite ends of a short line secured thereto, said short line being passed through a ring secured to said deep lines of said commercial setup, said weight being made of a lead metal, a forward one of said brass rings being over a head portion of said body and the other of said brass rings comprising a balance ring located rearwardly thereof, and said line between said brass rings comprising a harness and consisting of one quarter inch cable.

* * * * *